United States Patent [19]
Kundrot et al.

[11] Patent Number: 6,131,445
[45] Date of Patent: *Oct. 17, 2000

[54] FUEL TANK SENSOR ASSEMBLY

[75] Inventors: John Alfred Kundrot, Westland; Jeffrey A. Jakubowicz, Dearborn; Srini S. Gengusamy, Northville; Jerry Lee Springer, Livonia, all of Mich.

[73] Assignee: Ford Motor Company, Dearborn, Mich.

[*] Notice: This patent is subject to a terminal disclaimer.

[21] Appl. No.: 08/948,500

[22] Filed: Oct. 10, 1997

[51] Int. Cl.[7] .................................................... G01M 19/00
[52] U.S. Cl. .............................. 73/118.1; 73/756; 73/119
[58] Field of Search .................................. 73/756, 118.1, 73/119

[56] References Cited

U.S. PATENT DOCUMENTS

| | | |
|---|---|---|
| 4,960,153 | 10/1990 | Bergsma . |
| 5,083,583 | 1/1992 | Benjey . |
| 5,261,379 | 11/1993 | Lipinski et al. . |
| 5,267,470 | 12/1993 | Cook . |
| 5,313,977 | 5/1994 | Bergsma et al. . |
| 5,386,812 | 2/1995 | Curran et al. . |
| 5,404,756 | 4/1995 | Briggs et al. . |
| 5,404,907 | 4/1995 | Benjey et al. . |
| 5,411,004 | 5/1995 | Busato et al. . |
| 5,438,877 | 8/1995 | Vowles et al. . |
| 5,621,176 | 4/1997 | Nagano et al. . |

*Primary Examiner*—Max Noori
*Assistant Examiner*—Octavia Davis
*Attorney, Agent, or Firm*—Mark L. Mollon

[57] ABSTRACT

A fuel tank sensor assembly for an automotive fuel tank includes a sensor element mounted below a shear plane of the sensor assembly. In the event that a portion of the assembly is sheared off, the sensor element effectively seals off the sense port extending into the fuel tank thereby restricting liquid fuel from flowing from the tank.

20 Claims, 3 Drawing Sheets

FUEL TANK SENSOR ASSEMBLY

FIELD OF THE INVENTION

The present invention relates to fuel tank sensor assemblies, and more particularly, to fuel tank sensor assemblies restricting liquid fuel flow from the fuel tank.

BACKGROUND OF THE INVENTION

Conventional fuel delivery systems for automotive vehicles typically include a fuel tank sensor, such as a pressure sensor, mounted on the fuel tank to sense the vapor pressure within the tank. This information is relayed to an electronic engine controller so that the controller can determine whether the vapor in the fuel tank must be purged. Purged vapor is then vented to the intake manifold of the engine to be consumed therein.

Prior art pressure sensor assemblies, such as that disclosed in U.S. Pat. No. 5,267,470, include a body having a first port extending into the fuel tank for evacuating purged vapor from the tank and a pressure sensor port communicating with a pressure sensor element. A check valve is located within the first port so that should the vehicle inadvertently roll over, liquid fuel does not flow therethrough.

The inventors of the present invention have found certain disadvantages with these prior art pressure sensor assemblies. For example, the pressure sensor port extends beyond the plane of the fuel tank. Thus, should a portion of the pressure sensor assembly shear off, the pressure sensor port may be exposed to the atmosphere resulting in liquid fuel potentially spilling from the fuel tank.

Further, prior art fuel pressure sensors are mounted to the fuel tank by inserting the assembly into the tank and rotating the assembly relative to the fuel tank to lock the sensor thereto. An O-ring used to seal the assembly to the tank must necessarily rub against either the assembly or the tank as the assembly rotates relative to the tank. This could create an undesirable situation where the O-ring either becomes abraded or misaligned.

SUMMARY OF THE INVENTION

An object of the present invention is to provide a fuel tank sensor assembly for sensing an operating condition within the fuel tank while simultaneously reducing the possibility of liquid fuel from flowing through the assembly. This object is achieved and disadvantages of prior art approaches are overcome by providing a novel fuel tank sensor assembly for an automotive fuel tank. The fuel tank sensor assembly includes a body defining an axis and having an internal facing portion and an external facing portion. The internal facing portion extends into the fuel tank and the external facing portion extends away from the fuel tank when the sensor assembly is mounted thereto. An axial extending port extends through the body and communicates between the internal facing portion and the external facing portion. A sensor element is sealingly mounted over the port and defines a sensor element plane. The sensor element is responsive to an operating condition within the tank. A fuel tank mounting ledge is formed on said body substantially near an interface between the internal facing portion and the external facing portion and defines a fuel tank mounting ledge plane. The sensor element plane lies between the internal facing portion and the fuel tank mounting ledge plane. Thus, the sensor element effectively seals the port so as to reduce the likelihood that liquid fuel can flow from the fuel tank should a portion of the sensor assembly shear off.

In a preferred embodiment, the sensor assembly includes at least one mounting tab formed on the internal facing portion. The tab engages the fuel tank when the assembly is axially inserted therein.

An advantage of the present invention is that a low cost, easily manufactured, sensor assembly is provided.

Another advantage of the present invention is that the possibility of the fuel flowing from the tank through the pressure sensor assembly is reduced.

Yet another advantage of the present invention is that the sensor assembly may be easily installed to a fuel tank.

Still another advantage of the present invention is that the integrity of the seal between the fuel tank and the sensor assembly is maintained.

Another advantage of the present invention is that a relatively compact sensor assembly is provided.

Other objects features and advantages of the present invention will be readily appreciated by the reader of the specification.

DETAILED DESCRIPTION OF THE PREFERRED EMBODIMENT

Figure 1:
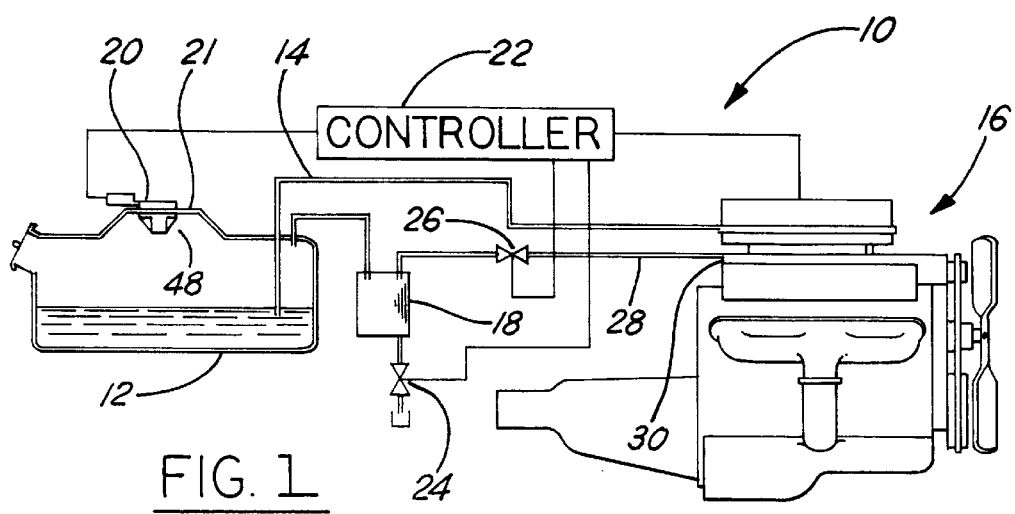
FIG. 1 is a diagrammatic representation of an automotive fuel system according to the present invention.
Figure 2:
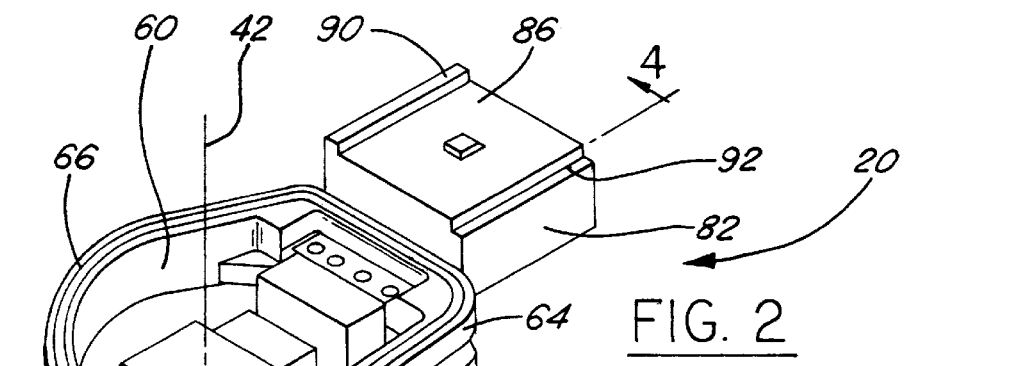
FIG. 2 and 3 are perspective views of a fuel tank sensor assembly according to the present invention.
Figure 3:
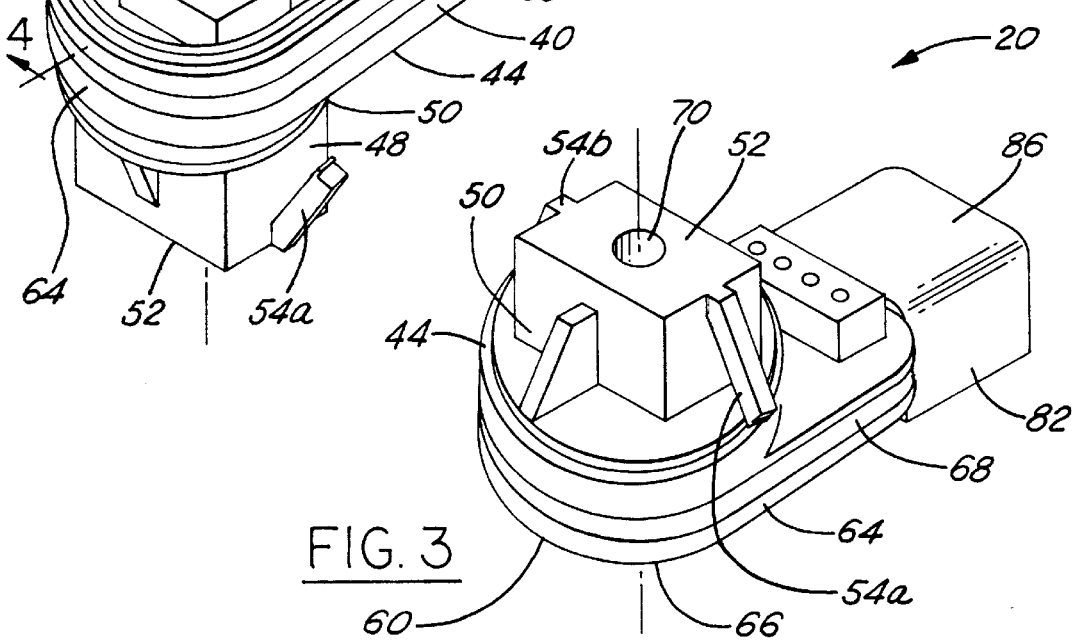

Fuel delivery system 10, shown in FIG. 1, includes fuel tank 12 coupled to fuel line 14 for delivering fuel to engine 16. Fuel vapor in fuel tank 12 may be stored in charcoal canister 18 for use by engine 16. As the pressure in tank 12 builds, sensor 20, which is mounted to tank flange 21, senses the pressure therein and relays the information to controller 22. If the pressure is above a predetermined threshold, controller 22 signals solenoid valves 24 and 26 to purge the stored fuel vapor from canister 18 so that the vapor flows from canister 18 through line 28 to intake manifold 30 of engine 16. Alternatively, a direct purge line (not shown) with a solenoid valve (not shown) may extend from tank 12 to manifold 30. In this case, should the vapor pressure exceed a predetermined threshold, controller 22 signals the solenoid valve (not shown) to allow the vapor in tank 12 to flow though the purge line (not shown) to manifold 30.

Turning now to FIGS. 2–7, fuel tank pressure sensor assembly 20 is described in greater detail. Sensor assembly 20 includes body 40 defining axis 42. Body 40 may be molded of an acetyl material or any other material which provides good fuel permeability. That is, a material that is not effected by fuel thereby undesirably allowing liquid or vapor fuel to permeate through body 40. Body 40 further includes fuel tank mounting ledge 44 defining fuel tank mounting ledge plane 46. Internal facing portion, such as a boss 48, is formed on body 40 and extends into fuel tank 12 when pressure sensor assembly 20 is mounted thereon. Boss 48 includes proximal end 50 lying adjacent fuel tank mounting ledge plane 46 and distal end 52 extending into fuel tank when assembly 20 is mounted thereon. Boss 48 includes mounting tabs 54a and 54b integrally formed to distal end 52. Mounting tabs 54a and 54b are radially flexibly cantilevered away from boss 48 and extend in a direction substantially toward proximal end 50. Accordingly, when sensor assembly 20 is axially inserted into fuel tank 10, mounting tabs 54a and 54b engage fuel tank flange 21. To seal assembly 20 to flange 21, O-ring 55 may be used (see FIGS. 4–6).

Pressure sensor assembly 20 further includes an external facing portion, shown as recess 60, formed on body 20. Recess 60 includes mounting surface 62 adjacent boss 48 and axially extending sidewall 64 having outer edge 66. According to the present invention, sidewall 64 includes a weakened zone 68, preferably of reduced cross-section, formed between outer edge 66 and fuel tank mounting plane 46. Weakened zone 68 allows recess 60 to shear from body 20 as will be further described hereinafter. Those skilled in the art will recognize in view of this disclosure that, although an area of reduced cross-section is preferred to provide weakened zone 68, other methods of creating a weakened zone may be used. For example, during molding of body 40, the characteristics of the material content at weakened zone 68 may be changed from the characteristics of the material forming the remainder of body 40. That is, weakened zone 68 may be treated, physically or chemically, to change the material characteristics so that weakened zone 68 may be produced with the desired effect of providing for a controlled fracture of recess 60 from body 40.

Figure 7:
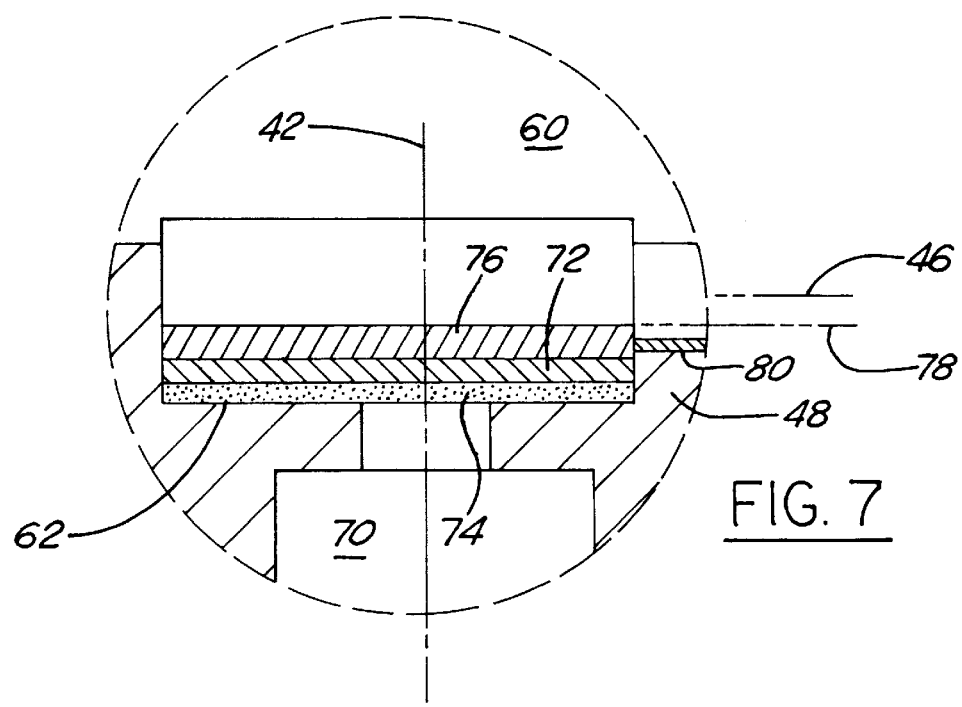

Sensor assembly 20 further includes port 70 extending through boss 48 into recess 60 substantially alone axis 42. According to the present invention, as best shown in FIG. 7, substrate 72 is adhesively mounted with adhesive 74 over port 70. Pressure sensor element 76 is mounted on substrate 72. Substrate 72 may be formed of a ceramic material or any other material which will effectively isolate stresses on pressure sensor element 76, withstand temperatures ranging from—40° F. to +120° F., and dissipate heat quickly. Pressure sensor 76 is responsive to fuel vapor pressure within tank 12.

Figure 4:
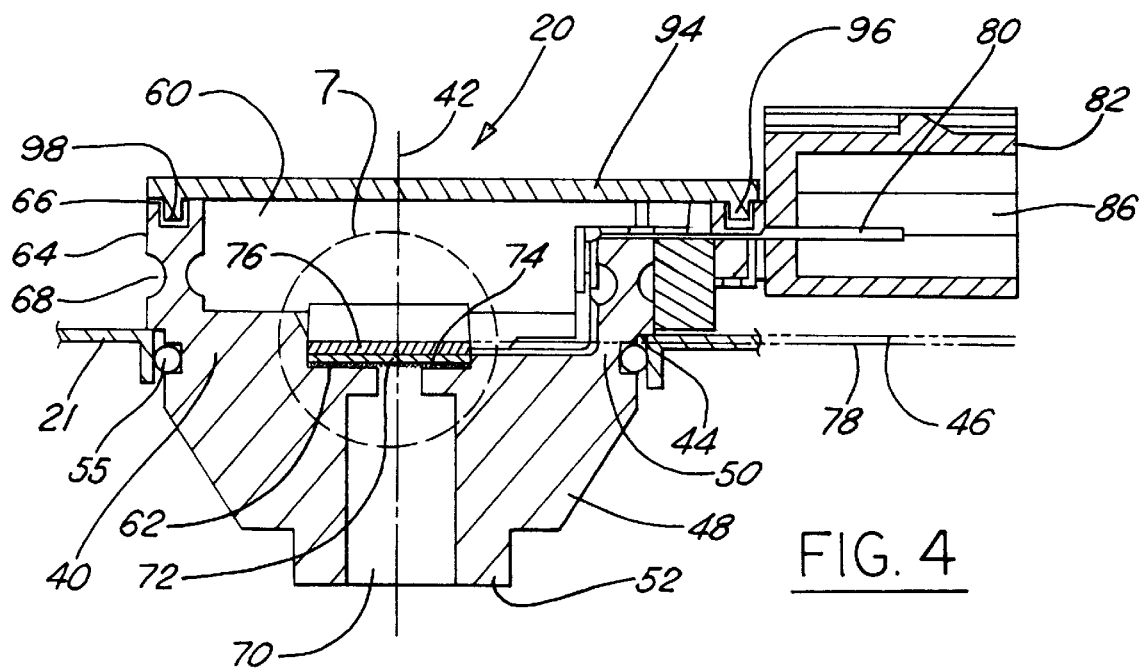
FIG. 4 is a cross-sectional view of the sensor assembly taken along line 4—4 of FIG. 2.
Figure 5:
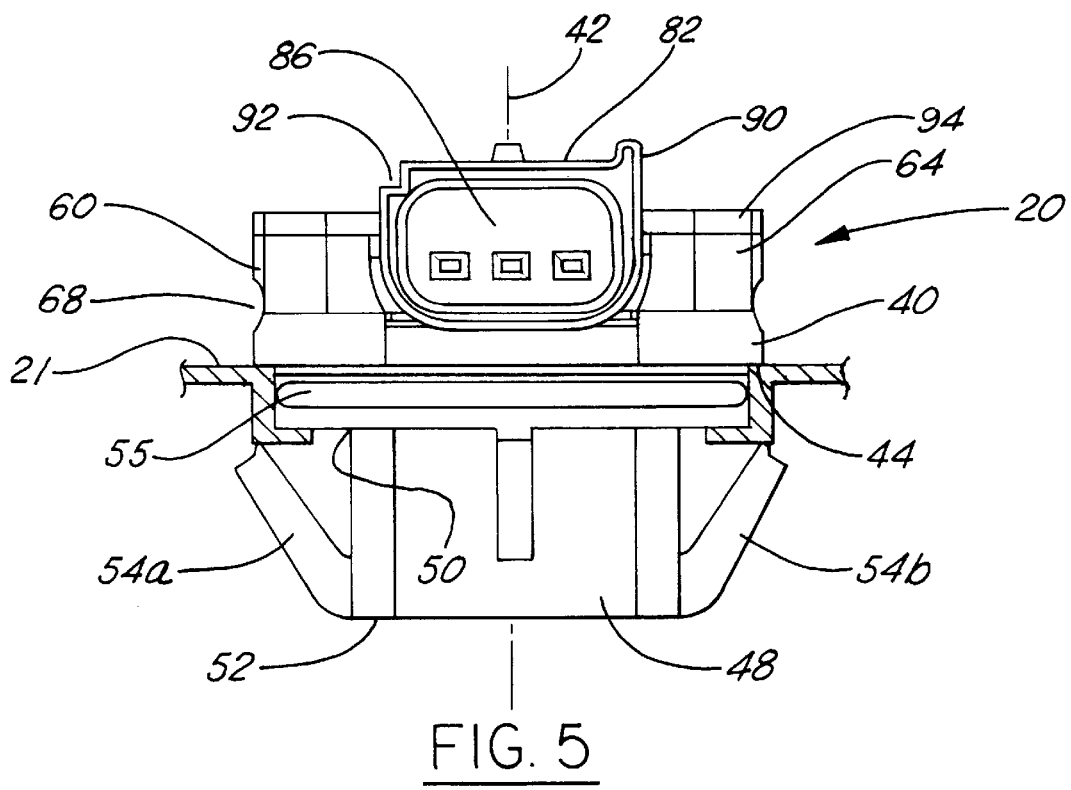
FIG. 5 is an in view of the sensor assembly according to the present invention.
Figure 6:
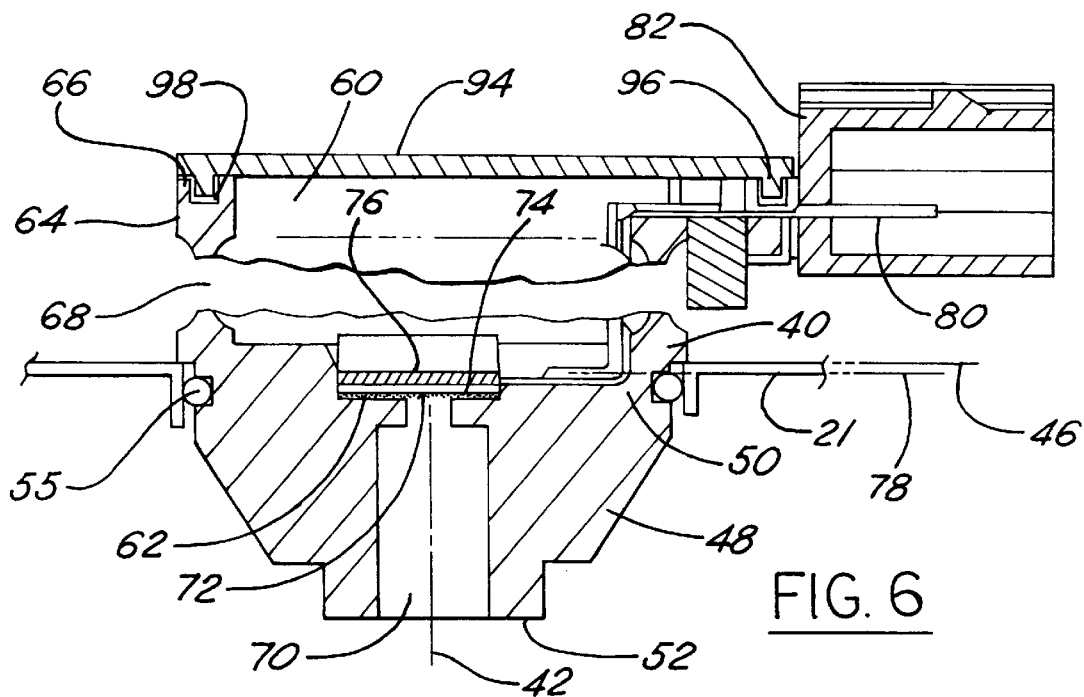
FIG. 6 is a cross-sectional view showing the function of the sensor assembly according to the present invention; and, FIG. 7 is an enlarged view of the area encircled by line 7 of FIG. 4.

According to the present invention, pressure, as best shown in FIGS. 4, 6 and 7, sensor element 76 defines pressure sensor element plane 78, which lies between boss 48 and fuel tank mounting ledge plane 46. Thus, in the event that, under adverse conditions recess 60 is separated from body 40 desirably and controllably through weakened zone 68, port 70 effectively remains sealed by element 76 and substantially restricts liquid fuel from flowing through port 70 from tank 12 because pressure sensor element plane 78 is below mounting ledge plane 46 and also below the weakened zone 68, Pressure sensor assembly further includes electrical bus 80 integrally formed in body 40. Bus 80 is connected to pressure sensor element 76. Electrical connector portion 82 is integrally formed on body 40 and envelops a portion of electrical bus 80 to form a female electrical connector 86 for ready connection to a connector (not shown) of controller 22. As best shown in FIG. 5, electrical connector portion includes extension portion 90 and recess portion 92 which cooperate with the mating connector (not shown) such that the attachment between the connectors occurs in a predetermined orientation.

Sensor assembly may also include cover 94 to cover recess 60 (see FIGS. 4, 5 and 6). Cover 94 may include a male tab 96 engaging socket 98 (see FIG. 4 and 6).

While the best mode for carrying out the invention as described in details, those skilled in the art in which this invention relates will recognize various alternative designs and embodiments, including those mentioned above, in practicing the invention that has been defined by the following claims. In particular, while the example shown herein is described with reference to a pressure sensor assembly, other sensors may used.

What is claimed is:

1. A fuel tank sensor assembly for an automotive fuel tank, with said fuel tank sensor assembly comprising:

a body defining an axis and having an internal facing portion and an external facing portion, with said internal facing portion extending into the fuel tank when said assembly is mounted thereto, and with said external facing portion extending away from the fuel tank when said assembly is mounted thereto;

an axial extending port extending through said body and communicating between said internal facing portion and said external facing portion;

a sensor element sealingly mounted over said port and defining a sensor element plane, with said sensor element being responsive to an operating condition within the tank and with said sensor element substantially restricting liquid fuel from flowing from the fuel tank through said port; and, a fuel tank mounting ledge formed on said body substantially near an interface between said internal facing portion and said external facing portion and defining a fuel tank mounting ledge plane, with said sensor element plane lying between said internal facing portion and said fuel tank mounting ledge plane.

2. A fuel tank sensor assembly according to claim 1 wherein said body comprises a weakened zone, with said weakened zone lying between said external facing portion and said fuel tank mounting ledge plane.

3. A fuel tank sensor assembly according to claim 2 wherein said weakened zone comprises an area of reduced cross-section.

4. A fuel tank sensor assembly according to claim 1 further comprising a substrate sealingly mounted between said port and said sensor element.

5. A fuel tank sensor assembly according to claim 4 wherein said substrate is formed of a ceramic material.

6. A fuel tank sensor assembly according to claim 1 wherein said body is formed of an acetyl material.

7. A fuel tank sensor assembly according to claim 1 further comprising at least one mounting tab formed on said internal facing portion, with said tab engaging the fuel tank when said assembly is axially inserted therein.

8. A fuel tank sensor assembly according to claim 7 wherein said internal facing portion defines a proximal end and a distal end, with said proximal end being nearest to said external facing portion and with said distal end being furthest from said external facing portion, and wherein said mounting tab is integrally formed to said distal end of said internal facing portion, with said mounting tab being radially cantilevered away from said internal facing portion and extending in a direction substantially toward said proximal end.

9. A fuel tank sensor assembly according to claim 1 further comprising an electrical bus integrally formed in said body, with said bus being connected to said sensor element.

10. A fuel tank sensor assembly according to claim 9 further comprising an electrical connector portion integrally formed to said body, with said connector portion enveloping a portion of said electrical bus, thereby forming a female electrical connector.

11. A fuel tank sensor assembly according to claim 10 wherein said connector portion comprises means for attaching said connector portion to a desired mating connector such that said attachment occurs in a predetermined orientation.

12. A fuel tank sensor assembly for an automotive fuel tank comprising:

- a body defining an axis and having an internal facing portion and an external facing portion;
- a boss formed on said internal facing portion and extending from said body into the fuel tank when said assembly is mounted thereon;
- a recess formed on said external facing portion, with said recess defining a mounting surface adjacent said boss and an axially extending sidewall defining an outer edge;
- a port extending through said boss into said recess substantially along said axis;
- a sensor element sealingly mounted adjacent said mounting surface and covering said port and defining a sensor element plane, with said sensor element being responsive to an operating condition within the tank and with said sensor element substantially restricting liquid fuel from flowing from the fuel tank through said port; and,
- a fuel tank mounting ledge formed on said body substantially near an interface between said boss and said recess and defining a fuel tank mounting ledge plane, with said sensor element plane lying between said boss and said fuel tank mounting ledge plane.

13. A fuel tank sensor assembly according to claim 12 wherein said sidewall of said recess comprises an area of reduced cross-section formed between said outer edge of said sidewall and said fuel tank mounting ledge plane.

14. A fuel tank sensor assembly according to claim 12 further comprising a substrate sealingly mounted between said port and said sensor element.

15. A fuel tank sensor assembly according to claim 14 wherein said substrate is formed of a ceramic material.

16. A fuel tank assembly according to claim 12 wherein said body is formed of an acetyl material.

17. A fuel tank assembly according to claim 12 wherein said boss defines a proximal end and a distal end, with said proximal end being nearest to said recess and with said distal end being furthest from said recess, and wherein a mounting tab is integrally formed to said distal end of said boss, with said mounting tab being radially cantilevered away from said boss and extending in a direction substantially toward said proximal end such that said mounting tab engages the fuel tank when said assembly is axially inserted therein.

18. A fuel tank sensor assembly according to claim 12 further comprising:

- an electrical bus integrally formed in said body, with said bus being connected to said sensor element;
- an electrical connector portion integrally formed to said body, with said connector portion enveloping a portion of said electrical bus, thereby forming a female electrical connector; and,
- a means for attaching said connector portion to a desired mating connector such that said attachment occurs in a predetermined orientation.

19. A fuel tank pressure sensor assembly for an automotive fuel tank comprising:

- a body defining an axis and having a fuel tank mounting ledge defining a fuel tank mounting ledge plane;
- a boss formed on said body and extending into the fuel tank when said assembly is mounted thereon, with said boss defining a proximal end and a distal end, with said proximal end lying adjacent said fuel tank mounting ledge plane, with said distal end extending furthest into the fuel tank when said assembly is mounted thereon, with said boss comprising a mounting tab integrally formed to said distal end of said boss, with said mounting tab being radially cantilevered away from said boss and extending in a direction substantially toward said proximal end such that said mounting tab engages the fuel tank when said assembly is axially inserted therein;
- a recess formed on said body, with said recess defining a mounting surface adjacent said boss and an axially extending sidewall defining an outer edge, with said sidewall comprising an area of reduced cross-section formed between said outer edge of said sidewall and said fuel tank mounting ledge plane;
- a port extending through said boss into said recess substantially along said axis;
- a substrate sealingly adhesively mounted over said port;
- a pressure sensor element mounted on said substrate, with said pressure sensor element being responsive to fuel vapor pressure within the tank and with said pressure sensor element substantially restricting liquid fuel from flowing frog the fuel tank through said port, with said pressure sensor element defining a pressure sensor element plane, with said pressure sensor element plane lying between said boss and said fuel tank mounting ledge plane;
- an electrical bus integrally formed in said body, with said bus being connected to said pressure sensor element;
- an electrical connector portion integrally formed to said body, with said connector portion enveloping a portion of said electrical bus, thereby forming a female electrical connector; and,
- a means for attaching said connector portion to a desired mating connector such that said attachment occurs in a predetermined orientation.

20. A fuel tank pressure assembly according to claim 19 wherein said body is formed of an acetyl material.

* * * * *